(12) United States Patent  
Alvarado et al.

(10) Patent No.: US 12,484,180 B2  
(45) Date of Patent: Nov. 25, 2025

(54) SERVER SYSTEM OPEN COMPUTE PROJECT MOUNTING SYSTEM

(71) Applicant: Dell Products L.P., Round Rock, TX (US)

(72) Inventors: Daniel Alvarado, Pflugerville, TX (US); Mark A. Smith, Georgetown, TX (US); Po-Li Hsieh, Taoyuan (TW)

(73) Assignee: Dell Products L.P., Round Rock, TX (US)

( * ) Notice: Subject to any disclaimer, the term of this patent is extended or adjusted under 35 U.S.C. 154(b) by 255 days.

(21) Appl. No.: 18/130,115

(22) Filed: Apr. 3, 2023

(65) Prior Publication Data

US 2024/0334636 A1    Oct. 3, 2024

(51) Int. Cl.
*H05K 7/14* (2006.01)
*G06F 1/18* (2006.01)

(52) U.S. Cl.
CPC ........... *H05K 7/1489* (2013.01); *G06F 1/183* (2013.01)

(58) Field of Classification Search
None
See application file for complete search history.

(56) References Cited

U.S. PATENT DOCUMENTS

| 5,010,426 | A  | * | 4/1991 | Krenz ................. | H05K 7/1411 |
| | | | | | 360/99.06 |
| 5,128,830 | A  | * | 7/1992 | Deluca ................ | H05K 7/1454 |
| | | | | | 361/752 |
| 6,317,329 | B1 | * | 11/2001 | Dowdy ............... | H05K 7/1424 |
| | | | | | 361/801 |
| 7,075,796 | B1 | * | 7/2006 | Pritchett ............... | G06F 1/185 |
| | | | | | 361/756 |
| 10,405,453 | B1 | * | 9/2019 | Cunningham ....... | H01R 25/006 |
| 2017/0094822 | A1 | * | 3/2017 | Chen ................... | G11B 33/128 |
| 2020/0100392 | A1 | * | 3/2020 | Iyengar ............... | H05K 7/1487 |
| 2021/0051814 | A1 |   | 2/2021 | Carver et al. | |

* cited by examiner

*Primary Examiner* — Allen L Parker
*Assistant Examiner* — Christopher L Augustin
(74) *Attorney, Agent, or Firm* — Terrile, Cannatti & Chambers, LLP; Stephen A. Terrile

(57) ABSTRACT

A floating open compute project retention system. The floating open compute project retention system includes a floating open compute project component guide device and a floating open compute project component retention device, the floating open compute project component retention device providing access to the floating open compute project component guide device when in an open position and fixedly mounting a floating open compute project receiving assembly within an open compute project mounting bay when in a closed position.

18 Claims, 18 Drawing Sheets

SERVER SYSTEM OPEN COMPUTE PROJECT MOUNTING SYSTEM

BACKGROUND OF THE INVENTION

Field of the Invention

The present invention relates to information handling systems. More specifically, embodiments of the invention relate to server type information handling systems within information technology (IT) environments.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

It is known to use information handling systems and related IT systems within information technology (IT) environments such as data centers.

SUMMARY OF THE INVENTION

A system and method for providing an open compute project (OCP) floating OCP (FLOP) retention system that allows for FLOP components to be stacked on top of each other to mate with stacked OCP network cards.

In one embodiment, the invention relates to a floating open compute project retention system, comprising: a floating open compute project component guide device; and, a floating open compute project component retention device, the floating open compute project component retention device providing access to the floating open compute project component guide device when in an open position and fixedly mounting a floating open compute project receiving assembly within an open compute project mounting bay when in a closed position.

In another embodiment, the invention relates to an open compute project mounting system comprising: an open compute project mounting bay; and, a floating open compute project retention system, comprising: a floating open compute project component guide device; and, a floating open compute project component retention device, the floating open compute project component retention device providing access to the floating open compute project component guide device when in an open position and fixedly mounting a floating open compute project receiving assembly within an open compute project mounting bay when in a closed position.

In another embodiment, the invention relates to a system comprising: a processor; a data bus coupled to the processor; an open compute project mounting bay; and, a floating open compute project retention system mounted within the open compute project mounting bay, the floating open compute project retention system comprising: a floating open compute project component guide device; and, a floating open compute project component retention device, the floating open compute project component retention device providing access to the floating open compute project component guide device when in an open position and fixedly mounting a floating open compute project receiving assembly within an open compute project mounting bay when in a closed position.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Figure 1:
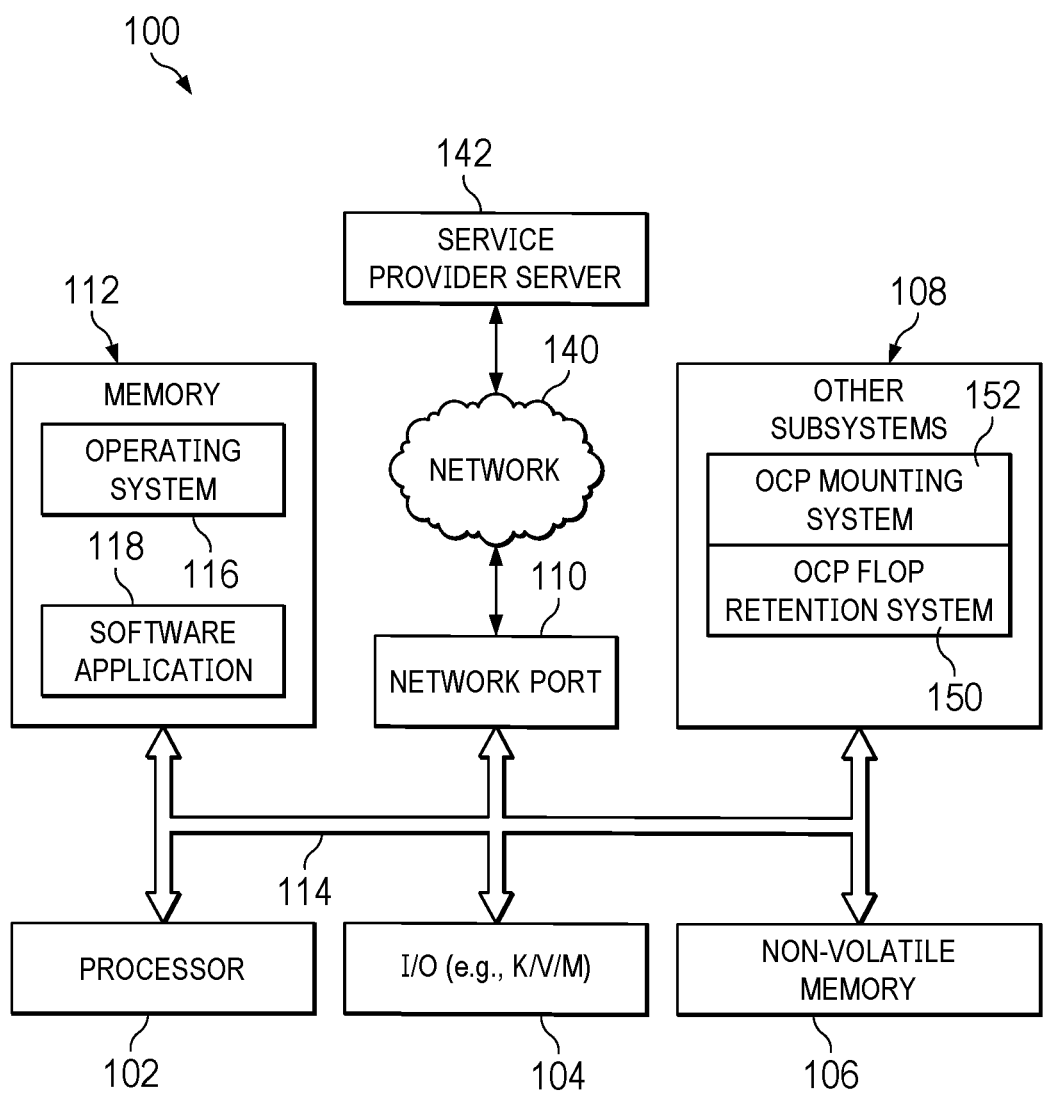
FIG. 1 shows a general illustration of components of an information handling system as implemented in the system and method of the present invention.

Various aspects of the disclosure include an appreciation that it is known to provide information handling systems with devices which conform to specifications defined by an open compute project (OCP) foundation. Various aspects of the disclosure include an appreciation that an example of devices which conform to the OCP include OCP type network devices. Various aspects of the disclosure include an appreciation that an OCP type network device may be instantiated as an OCP network card. Various aspects of the present disclosure include an appreciation that an OCP network card is a standard form factor card that is commonly supported in servers. Various aspects of the present disclosure include an appreciation that known OCP card network cards mate with an OCP card receiving component circuit board via a straddle connector that resides on a receiving board of the OCP card receiving component. Various aspects of the present disclosure include an appreciation that the OCP card receiving component may be configured within a motherboard of an information handling system or may be a stand-alone component. When the OCP card receiving component is configured as a stand-alone component, the OCP card receiving component is referred to as a floating OCP component (i.e., FLOP component) or floating OCP receiving assembly (i.e., FLOP receiving assembly).

Various aspects of the present disclosure include an appreciation that it would be desirable to provide a server offering which enables front I/O access to OCP network cards where OCP network cards can be stacked on top of each other. In certain embodiments, this stacking would enable vertical mounting of OCP network cards within a blade server type information handling system which conforms to a particular rack unit height. Various aspects of the present disclosure include an appreciation that stacking OCP network cards would likely necessitate provision of a FLOP card retention function that allows for the FLOP components to be stacked closely on top of each other.

A system and method are disclosed for providing an OCP FLOP retention system that allows for FLOP components to be stacked on top of each other to mate with stacked OCP network cards. In certain embodiments, the OCP FLOP retention system allows the OCP network cards and FLOP components to be accessible for individual servicing.

In certain embodiments, the OCP FLOP retention system allows dual stacked FLOP components and thus dual stacked OCP network cards. The OCP FLOP retention system provides a modular design which can be used across a plurality of server platforms. The OCP FLOP retention system provides a tool-less design for easy access to FLOP components for servicing and/or replacement. In certain embodiments, the OCP FLOP retention system includes grounding path for electro static discharge (ESD) protection of the FLOP network cards. In certain embodiments, the OCP FLOP retention system can interchangeably accommodate internal OCP network card latching configuration and external OCP network card latching configuration.

FIG. 1 shows a generalized illustration of an information handling system 100 that can be used to implement the system and method of the present invention. The information handling system 100 includes a processor (e.g., central processor unit or "CPU") 102, input/output (I/O) devices 104, such as a display, a keyboard, a mouse, and associated controllers, a hard drive or disk storage 106, and various other subsystems 108. In various embodiments, the information handling system 100 also includes network port 110 operable to connect to a network 140, which is likewise accessible by a service provider server 142. In various embodiments, one or both the other subsystems 108 or the network port 110 include an OCP FLOP retention system 150 and an OCP card mounting system 152. The information handling system 100 likewise includes system memory 112, which is interconnected to the foregoing via one or more buses 114. System memory 112 further comprises operating system (OS) 116. In certain embodiments, the information handling system 100 is one of a plurality of information handling systems within a data center. In certain embodiments, the information handling system 100 comprises a server type information handling system. In certain embodiments, the server type information handling system is configured to be mounted within a server rack. In certain embodiments, the other subsystem 108 includes one or more power supplies for supplying power to the other components of the information handling system 100.

In certain embodiments, the information handling system 100 comprises a server type information handling system. In certain embodiments, the server type information handling system comprises a blade server type information handling system. As used herein, a blade server type information handling system broadly refers to an information handling system which is physically configured to be mounted within a server rack.

In certain embodiments, the information handling system 100 includes an OCP FLOP retention system 150 which enables front I/O access to OCP network cards where OCP network cards can be stacked on top of each other. In certain embodiments, this stacking enables vertical mounting of OCP network cards within a server type information handling system which conforms to a particular rack unit height. In certain embodiments, the OCP FLOP retention system 150 allows for FLOP components to be stacked on top of each other to mate with stacked OCP network cards. In certain embodiments, the OCP FLOP retention system 150 allows the OCP network cards and FLOP components to be accessible for individual servicing.

In certain embodiments, the OCP FLOP retention system 150 allows dual stacked FLOP components and thus dual stacked OCP network cards. The OCP FLOP retention system 150 provides a modular design which can be used across a plurality of server platforms. The OCP FLOP retention system 150 provides a tool-less design for easy access to FLOP components for servicing and/or replacement. In certain embodiments, the OCP FLOP retention system 150 includes a grounding path for electro static discharge (ESD) protection of the FLOP network cards. In certain embodiments, the OCP FLOP retention system 150 can interchangeably accommodate internal OCP network card latching configuration and external OCP network card latching configuration.

In certain embodiments, the information handling system 100 includes an OCP card mounting system 152. In certain embodiments, the OCP card mounting system 152 provides an OCP card mounting system 152 that allows for OCP cards to be stacked on top of each other. In certain embodiments, the stacked OCP cards mate with stacked OCP FLOP components. In certain embodiments, the OCP card mounting system 152 allows the OCP cards and FLOP components to be accessible for individual servicing. In certain embodiments, the OCP card mounting system 152 includes a dual OCP card module that can accept a plurality of latching versions of the OCP card. In certain embodiments, the OCP card mounting system 152 supports both an internal version and an external latching version of the OCP card. In certain embodiments, the dual OCP card module allows OCP cards to be installed and removed from the front of the server.

In certain embodiments, the OCP card mounting system 152 provides a modular design which allows the system to be used across a plurality of server platforms. In certain embodiments, the OCP card mounting system 152 provides a tool-less design for the full array of open compute project defined use cases for OCP card installation and removal. In certain embodiments, the OCP card mounting system 152 includes a grounding path for electro static discharge for one or both the OCP card and the FLOP component.

Figure 2:
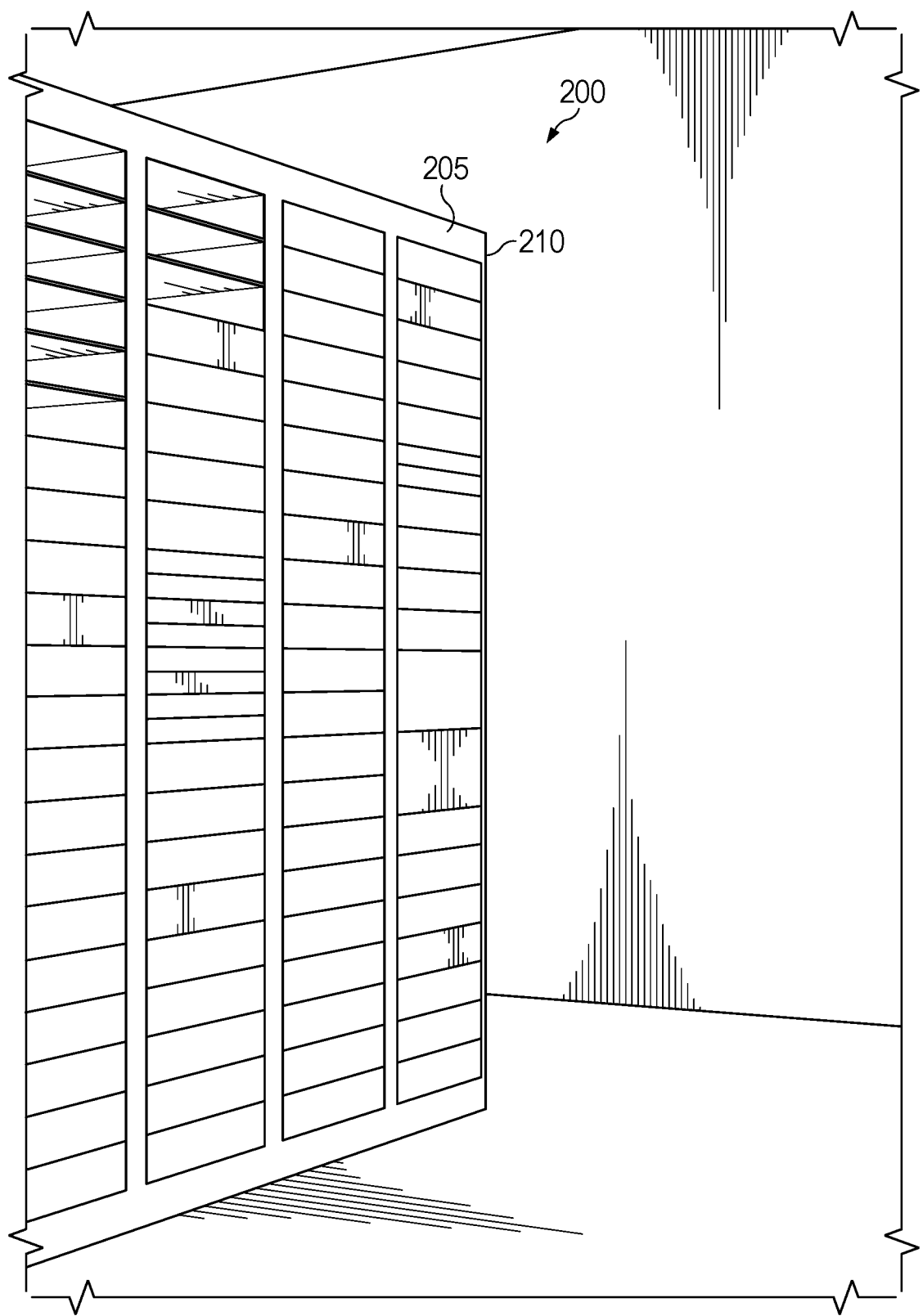
FIG. 2 shows a perspective view of a portion of a data center within an IT environment.

FIG. 2 shows a perspective view of a portion of an IT environment 200. The IT environment includes one or more racks 205 which include a plurality of information handling systems 100, often referred to as a server rack. In various embodiments, the IT environment 200 comprises a data center. As used herein, a data center refers to an IT environment which includes a plurality of networked information handling systems 100. In various embodiments, the information handling systems 100 of the data center include some or all of router type information handling systems, switch type information handling systems, firewall type information handling systems, storage system type information handling systems, server type information handling systems and application delivery controller type information handling systems. In certain environments, the information handling systems 100 are mounted within respective racks. As used herein, a rack refers to a physical structure that is designed to house the information handling systems 100 as well as the associated cabling and power provision for the information handling systems. In certain embodiments, a rack includes side panels to which the information handling systems are mounted. In certain embodiments, the rack includes a top panel and a bottom panel to which the side panels are attached. In certain embodiments, the side panels each include a front side panel and a rear side panel.

In certain embodiments, a plurality of racks is arranged continuous with each other to provide a rack system. An IT environment can include a plurality of rack systems arranged in rows with aisles via which IT service personnel can access information handling systems mounted in the racks. In certain embodiments, the aisles can include front aisles via which the front of the information handling systems may be accessed and hot aisles via which the infrastructure (e.g., data and power cabling) of the IT environment can be accessed.

Each respective rack includes a plurality of vertically arranged information handling systems 210. In certain embodiments, the information handling systems may conform to one of a plurality of standard server sizes. In certain embodiments, the plurality of server sizes conforms to particular rack unit sizes (i.e., rack units). As used herein, a rack unit broadly refers to a standardized server system height. As is known in the art, a server system height often conforms to one of a 1 U rack unit, a 2 U rack unit and a 4 U rack unit. In general, a 1 U rack unit is substantially (i.e., +/−20%) 1.75" high, a 2 U rack unit is substantially (i.e., +/−20%) 3.5" high and a 4 U rack height is substantially (i.e., +/−20%) 7.0" high.

Figure 3:
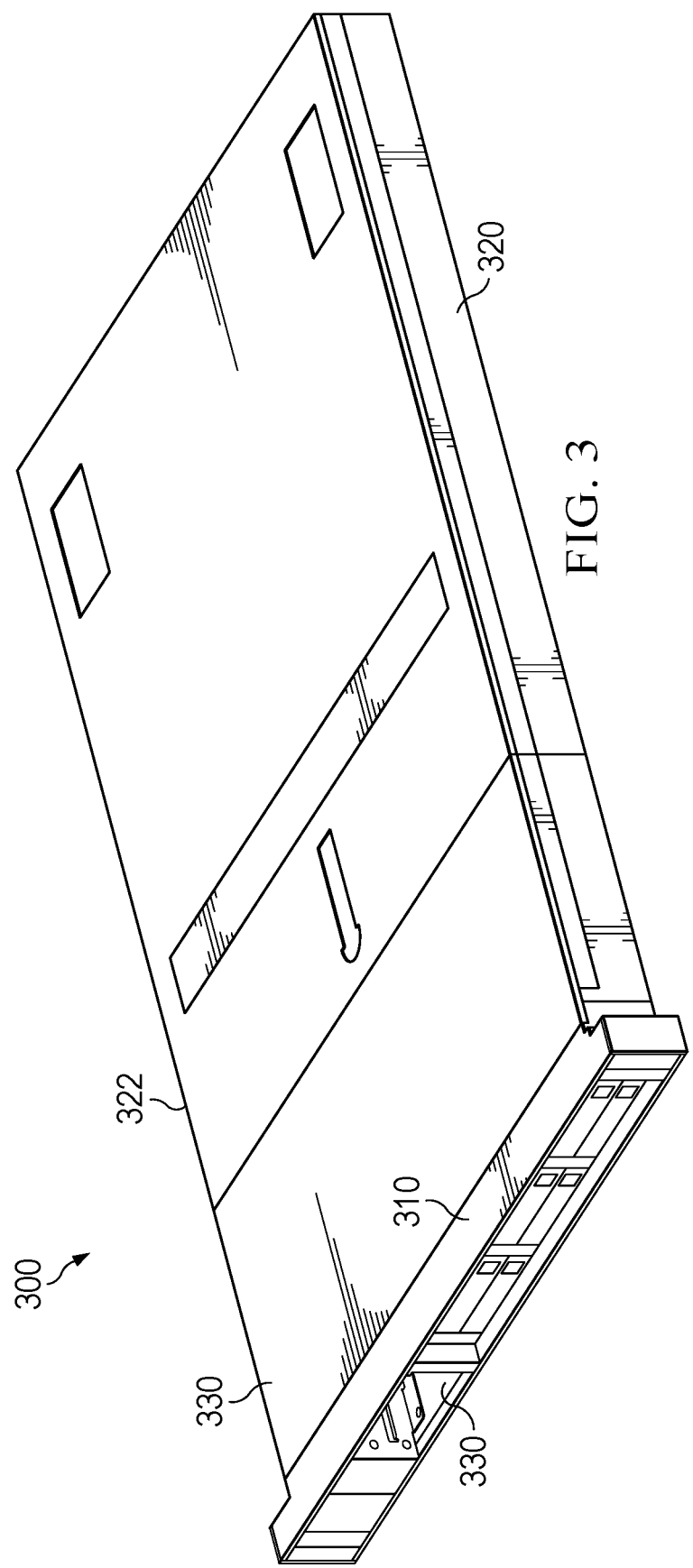
FIG. 3 shows a generalized perspective view of an example server type information handling system.

FIG. 3 shows a generalized perspective view of an example blade server type information handling system 300.

In certain embodiments, the server type information handling system includes a front portion 310, which is accessible when the server type information handing system 300 is mounted on a server rack. In certain embodiments, the side portions 320, 322 mount to the rack via respective server mounting components. In certain embodiments, the side portions mount to the rack via respective mechanical guiding features which are mechanically coupled to respective server mounting components. In certain embodiments, the server type information handling system can slide out from the rack via the respective mechanical guiding features. In certain embodiments, internal components of the blade type information handling system 300 may be accessed by removing a top panel 330 of the blade type information handing system 300. In certain embodiments, the blade type information handling system 300 includes a bay 350 via which components may be mounted to the blade type information handling system.

Figure 4:
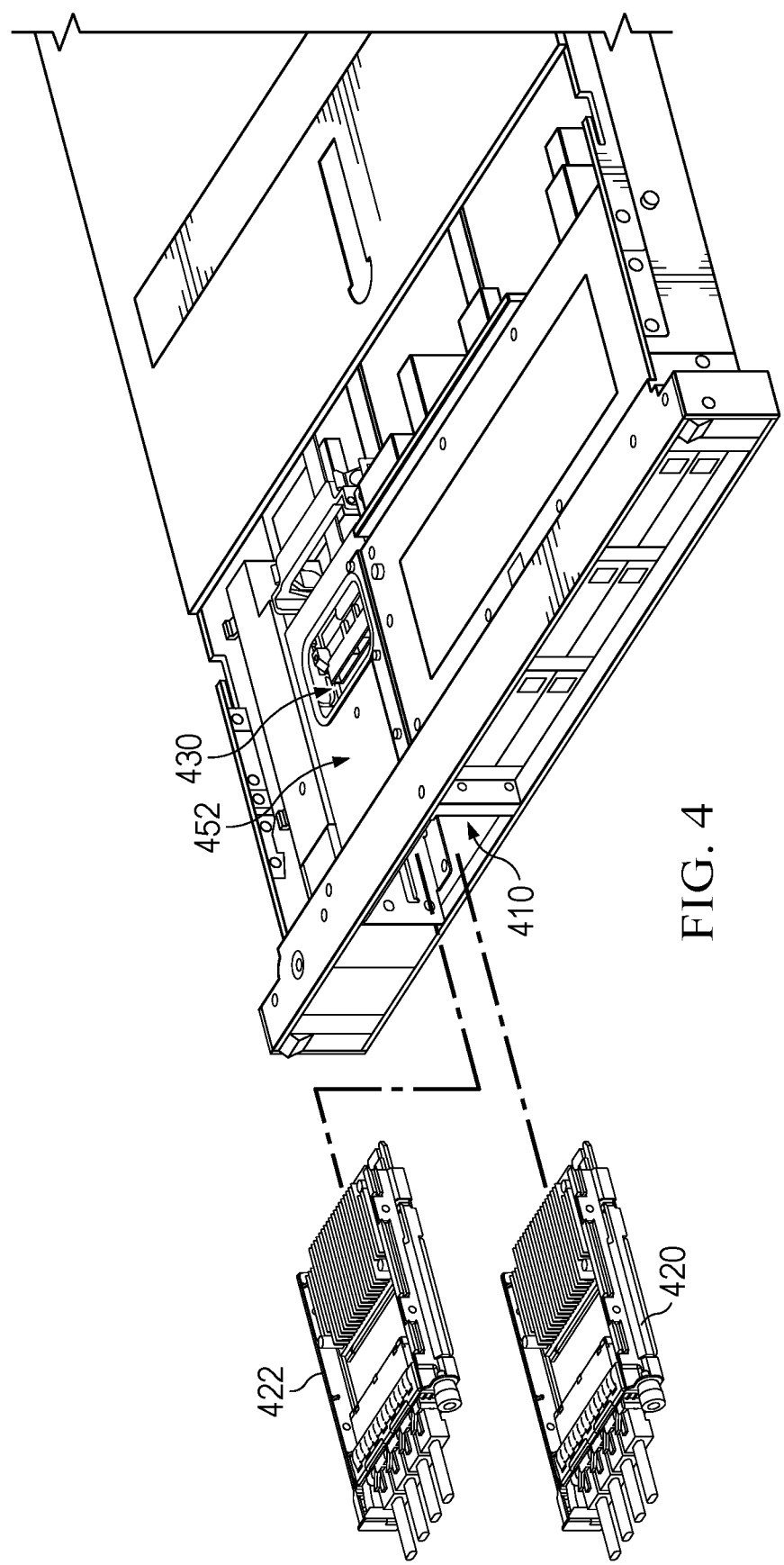
FIG. 4 shows a perspective view of a server type information handling system with an open compute project mounting bay.

FIG. 4 shows a perspective view of a server type information handling system 400 with a mounting bay 410 which is configured to mount cards corresponding to predefined form factors. In certain embodiments, the form factors may correspond to an open compute project card form factor. In certain embodiments, the mounting bay 410 functions as an open compute project mounting bay. In certain embodiments, the mounting bay 410 is configured to mount a first OCP card 420 and a second OCP card 422 within a single open compute project mounting bay 410. In certain embodiments, the mounting bay 410 may be configured to mount a plurality of cards either vertically or horizontally. In certain embodiments, the mounting bay 410 may be configured to mount more than two cards. For example, with an information handling system having a height of 1 U, a mounting bay 410 may be configured to mount four cards via two sets of vertically mounted cards. For example, with an information handling system having a height of 2 U, the mounting bay 410 may be configured to vertically mount four OCP cards. In certain embodiments, the open compute project mounting bay 410 includes a FLOP retention system 430 and a card mounting system.

In certain embodiments, the FLOP retention system 430 enables front I/O access to the cards 420, 422. In certain embodiments, the FLOP retention system 430 enables cards 420, 422 to be stacked on top of each other. In certain embodiments, this stacking enables vertical mounting of network cards within the server type information handling system 400 which conforms to a particular rack unit height. In certain embodiments, the FLOP retention system 150 allows for floating OCP (FLOP) receiving components to be stacked on top of each other to mate with the stacked OCP cards 420, 422. In certain embodiments, the FLOP retention system 430 allows the OCP cards and FLOP receiving components to be accessible for individual servicing.

In certain embodiments, the FLOP retention system 430 allows dual stacked FLOP components and thus dual stacked network cards. The FLOP retention system 430 provides a modular design which can be used across a plurality of server platforms. The FLOP retention system 430 provides a tool-less design for easy access to FLOP components for servicing and/or replacement. In certain embodiments, the FLOP retention system 430 includes a grounding path for electro static discharge (ESD) protection of the FLOP network cards. In certain embodiments, the FLOP retention system 430 can interchangeably accommodate internal OCP card latching configuration (e.g., OCP card 420) and external OCP card latching configurations (e.g., OCP card 422).

In certain embodiments, the information handling system 100 includes a card mounting system 452. In certain embodiments, the card mounting system 452 provides a card mounting system that allows for cards, such as OCP cards, to be stacked on top of each other. In certain embodiments, the stacked OCP cards mate with stacked OCP FLOP components. In certain embodiments, the card mounting system 452 allows the cards and FLOP components to be accessible for individual servicing. In certain embodiments, the card mounting system 452 includes a dual OCP card bay that can accept either latching version of the OCP card. In certain embodiments, the dual OCP card bay allows OCP cards to be installed and removed from the front of the server.

In certain embodiments, the card mounting system 452 supports both internal and external latching versions of the OCP card. In certain embodiments, the card mounting system 452 provides a modular design which allows the system to be used across a plurality of server platforms. In certain embodiments, the card mounting system 452 provides a tool-less design for the full array of open compute project defined use cases for card installation and removal. In certain embodiments, the card mounting system 452 includes a grounding path for electro static discharge for one or both the OCP card and the FLOP component.

Figure 5A:
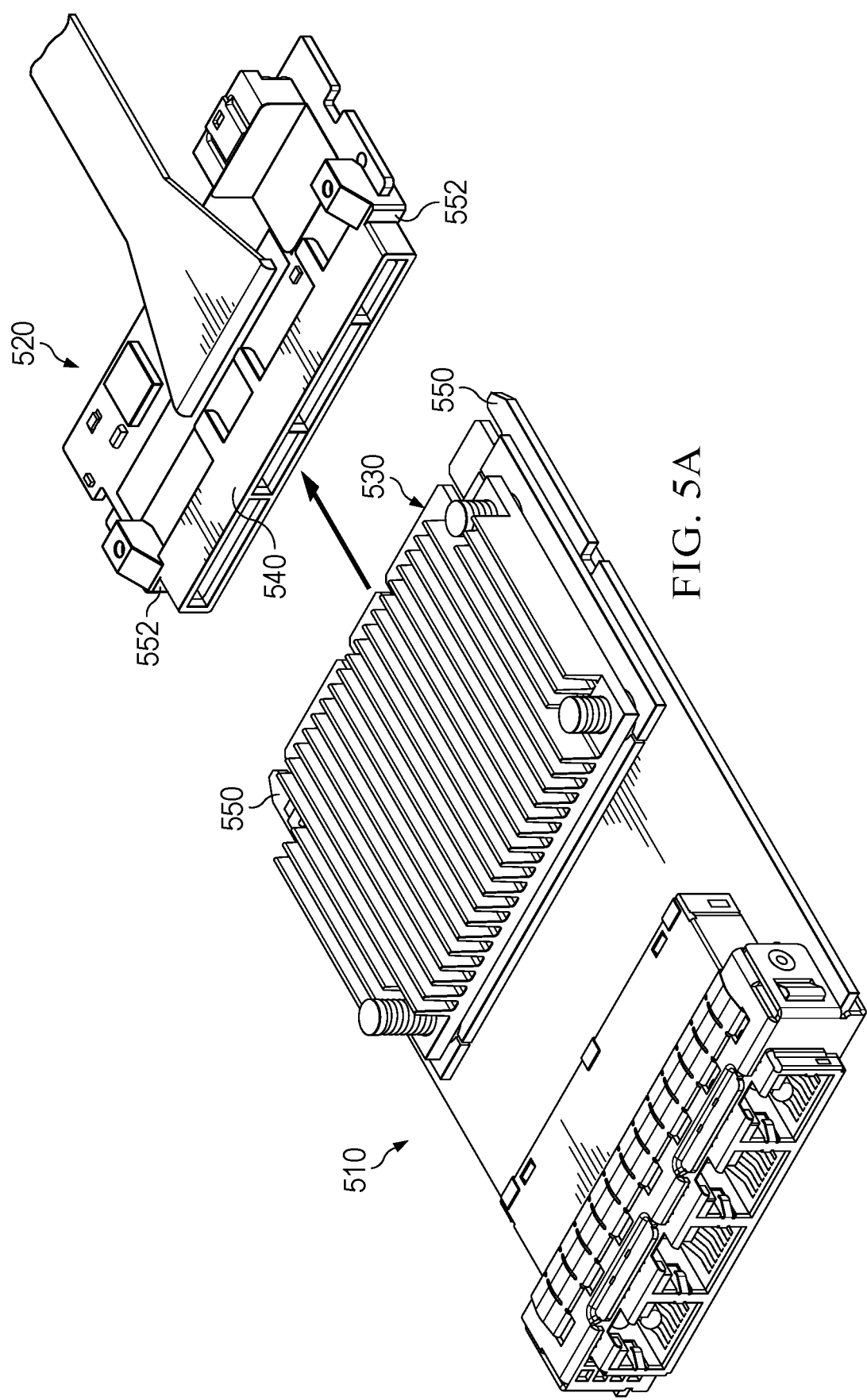
FIGS. 5A and 5B, generally referred to as FIG. 5, show perspective views of an open compute project card and an open compute project card receiving component.
Figure 5B:
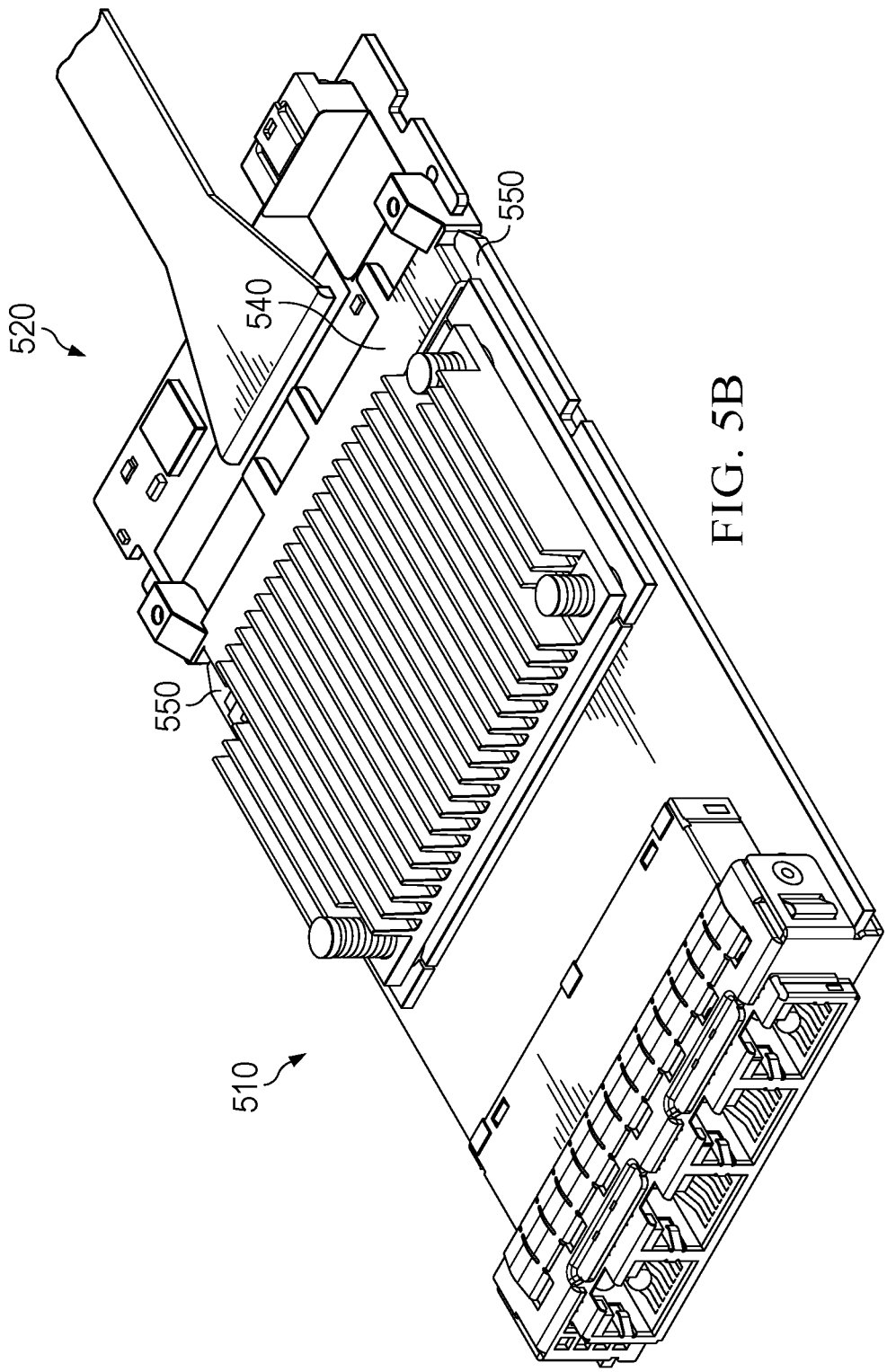

FIGS. 5A and 5B, generally referred to as FIG. 5, show perspective views of an open compute project card 510 and a floating card receiving component 520 which is configured to receive cards corresponding to predefined form factors. In certain embodiments, the form factors may correspond to an open compute project card form factor. In certain embodiments, the floating card receiving component functions as a floating open compute project (also referred to as FLOP) card receiving component. In certain embodiments, the open computer project card 510 includes a card edge 530 which mates with a receiving connector 540 on the floating open compute project card receiving component 520. In certain embodiments, the open compute project card 510 is hot pluggable with the floating receiving component. In certain embodiments, the open compute project card includes alignment projections 550 which interface with alignment indentations 552 positioned on one or both sides of the receiving connector 540 of the floating receiving component 520.

In certain embodiments, the open compute project card 510 and the floating receiving component 520 conform to a small form factor (SFF) size defined by the open compute project. In certain embodiments, the open compute card 510 and the floating receiving component 520 conform to a tall small form factor (TSFF) size defined by the open compute project.

Figure 6A:
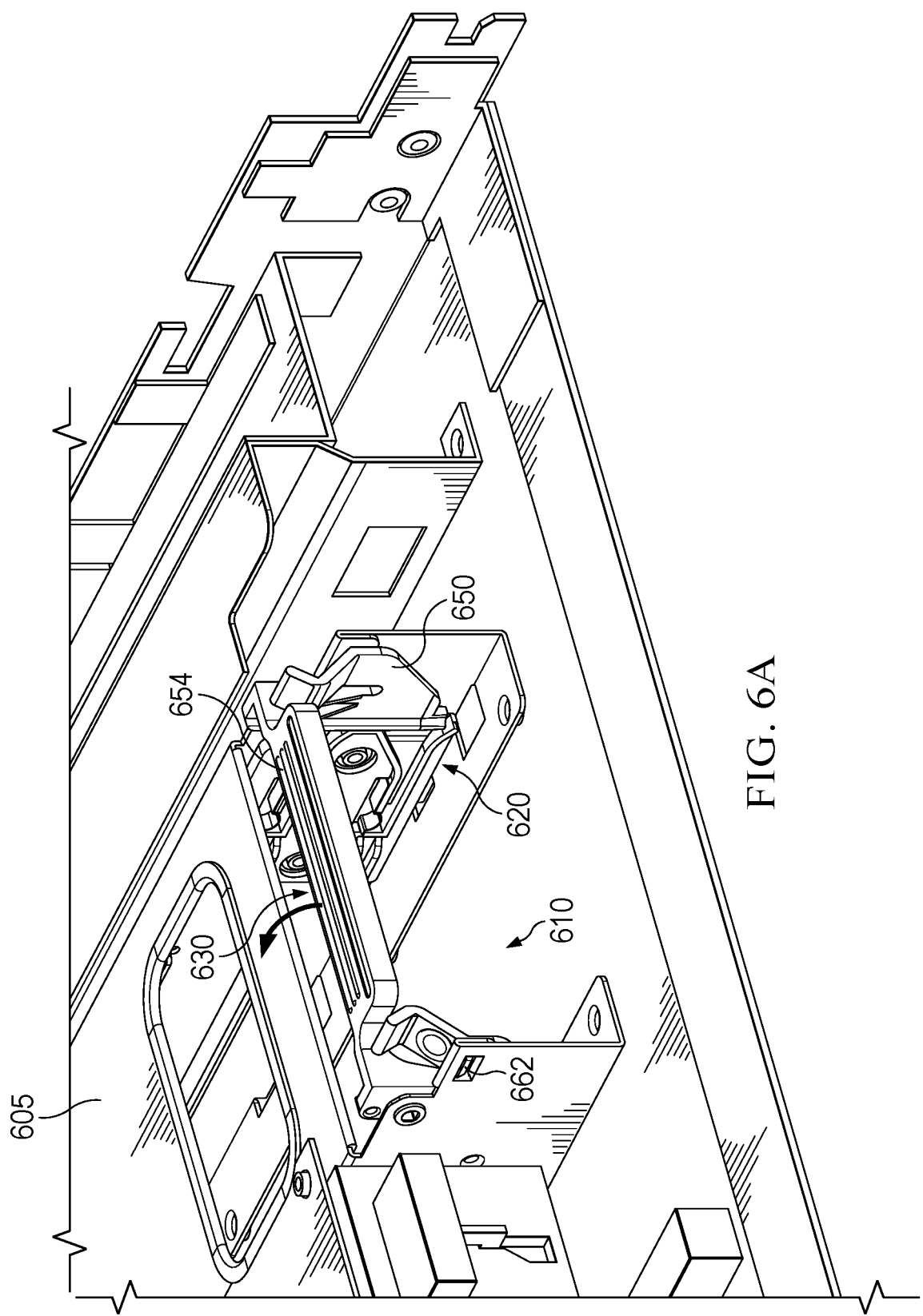
FIGS. 6A and 6B, generally referred to as FIG. 6, show perspective views of a rear portion of an open compute project mounting bay.
Figure 6B:
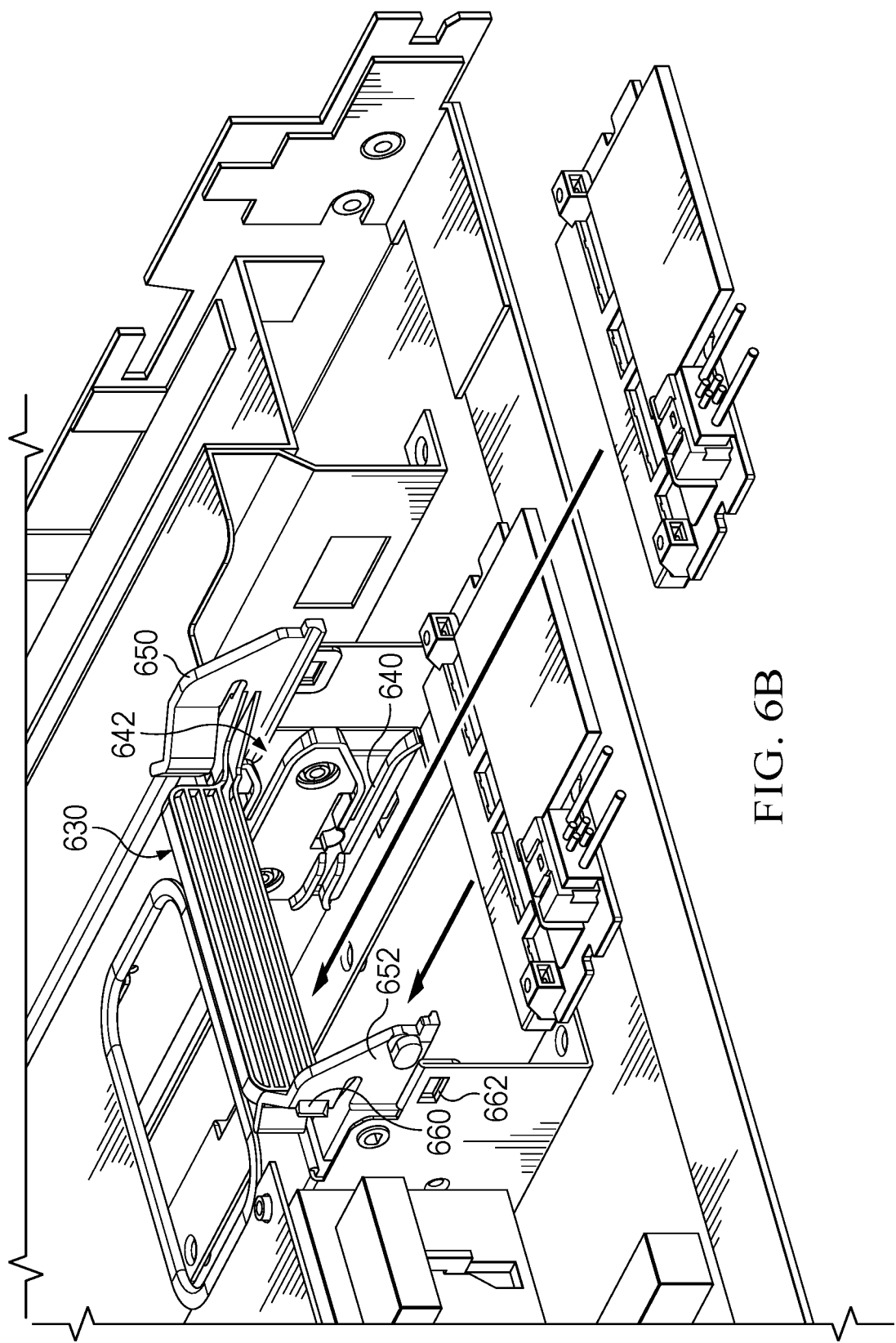
Figure 6C:
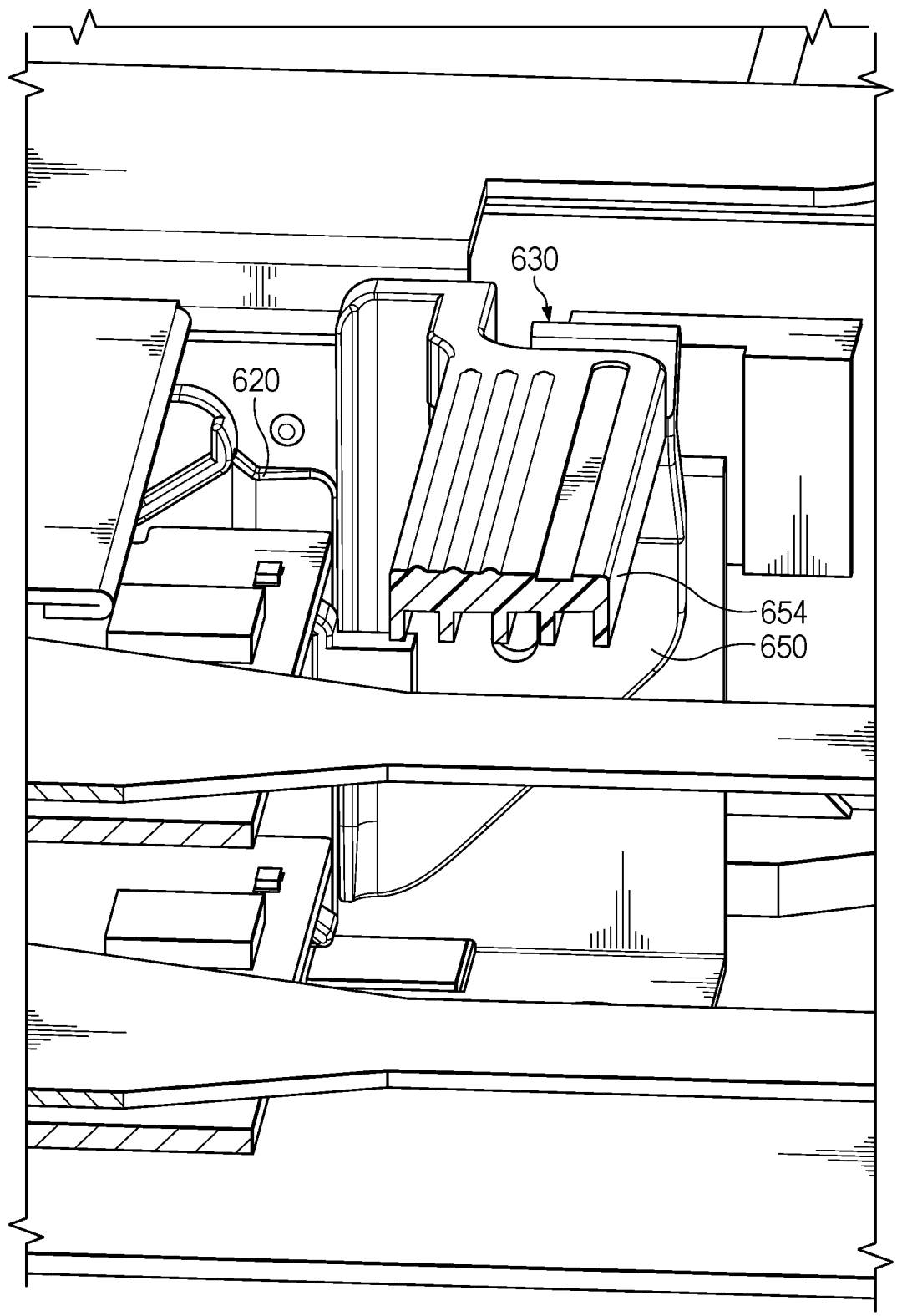
FIG. 6C, generally referred to as FIG. 6, shows a cross sectional view of a portion of an open compute project mounting bay.
Figure 7:
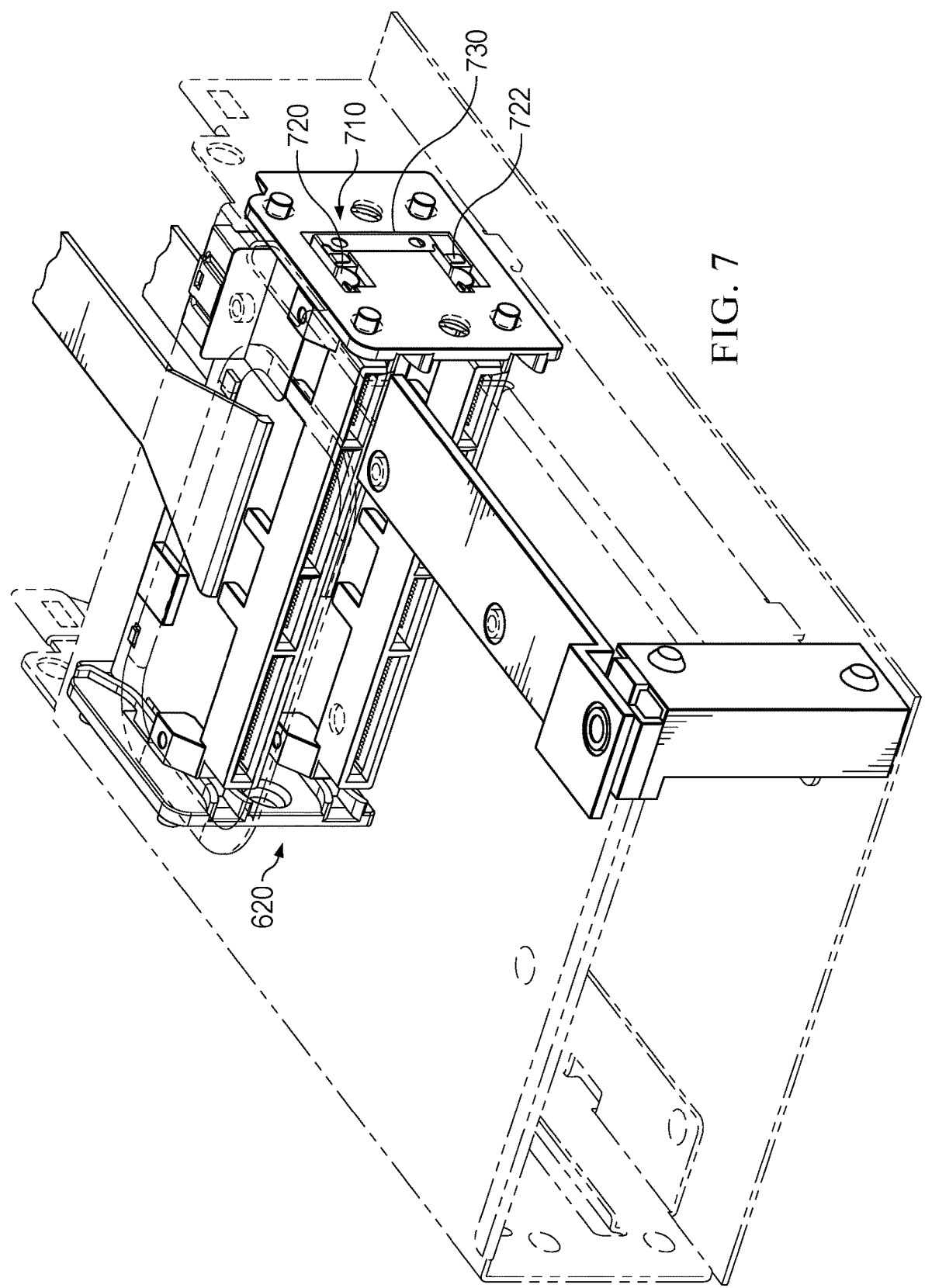
FIG. 7 shows a cut away perspective view of an open compute project mounting bay.
Figure 8:
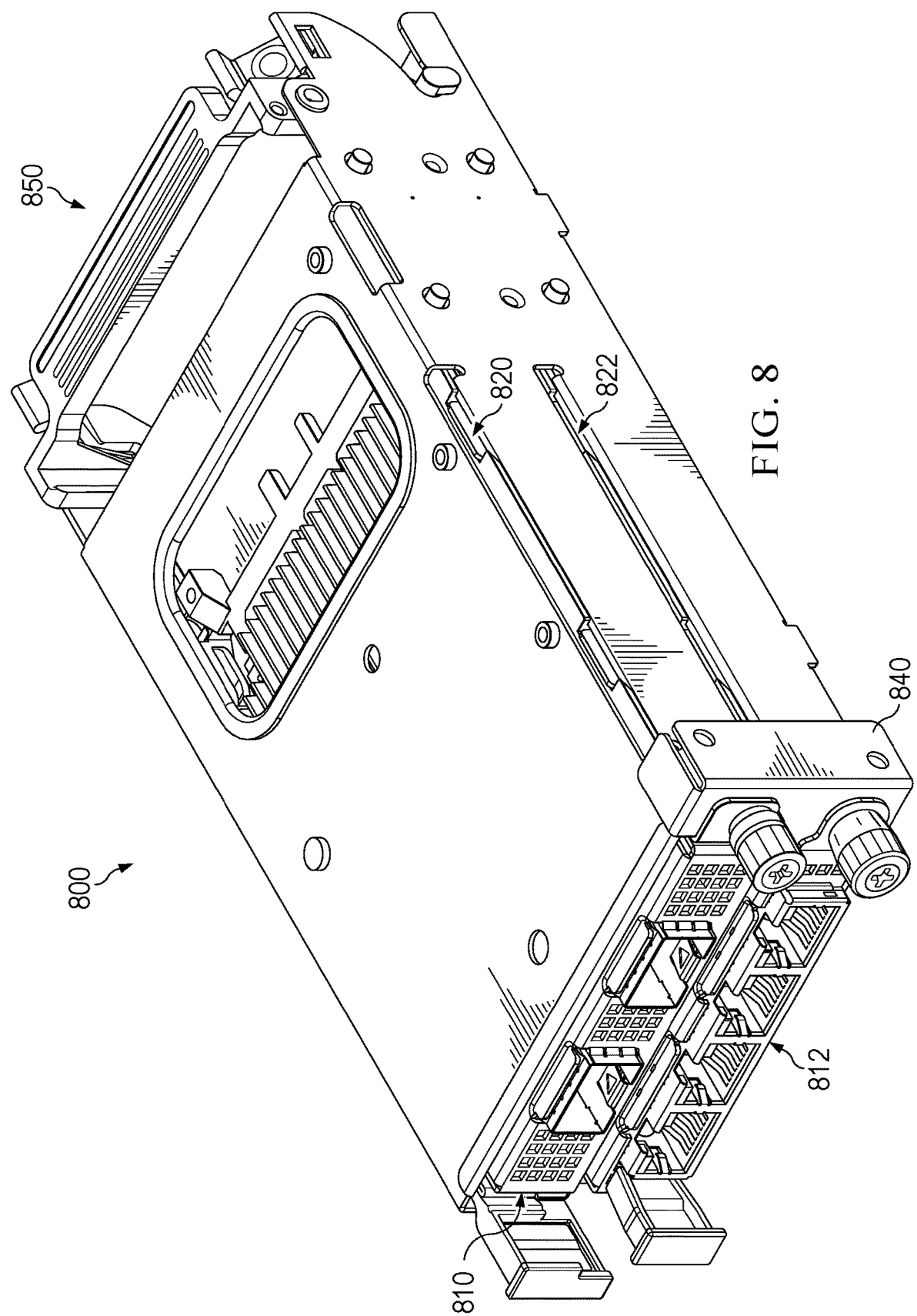
FIG. 8 shows a perspective view of an OCP mounting bay with dual stacked OCP card modules installed.
Figure 9:
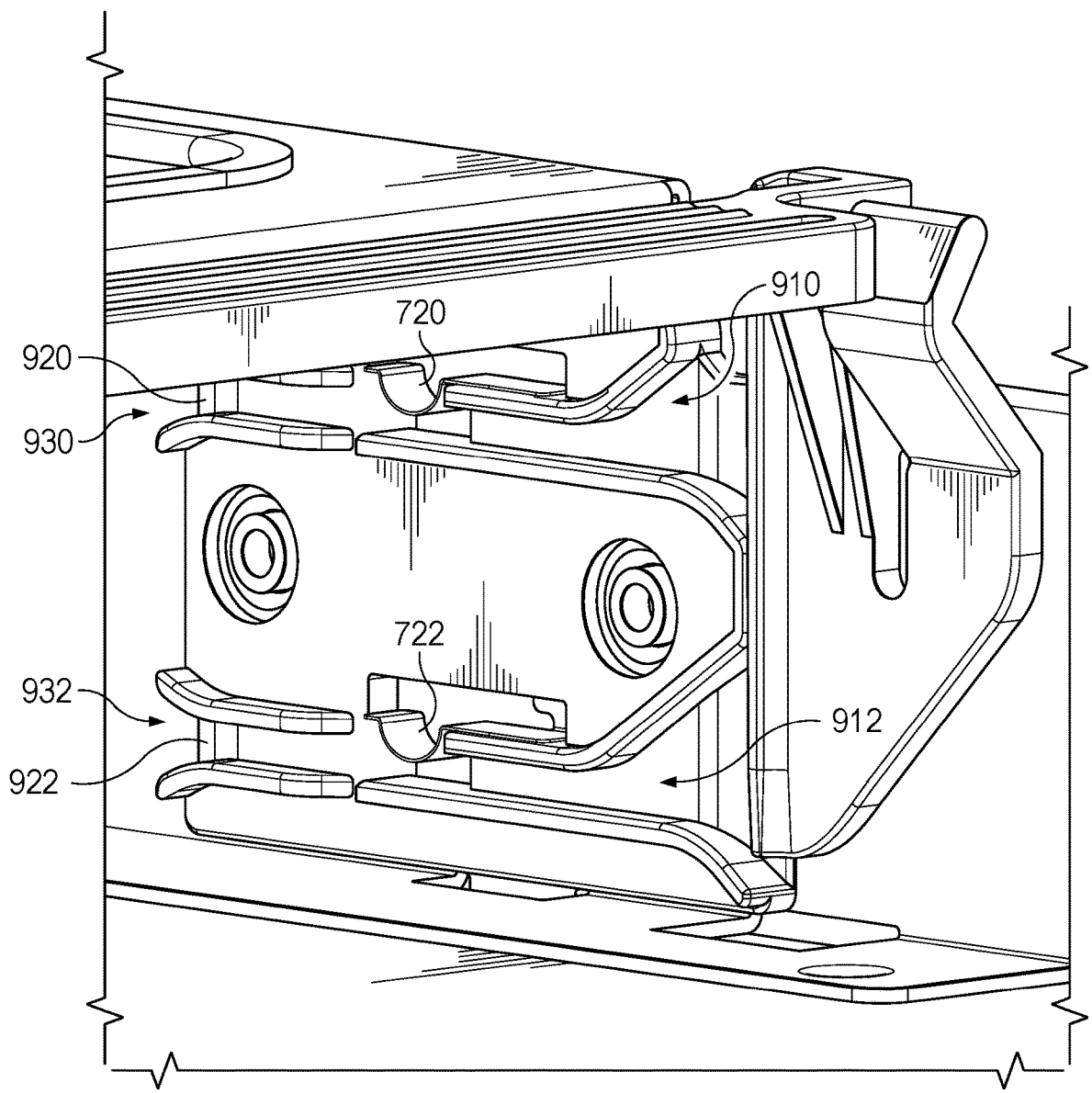
FIG. 9 shows a perspective view of an open compute project mounting bay alignment component.

FIGS. 6A and 6B, generally referred to as FIG. 6, show perspective views of a rear portion of an open mounting bay 605. FIG. 6C shows a cut away cross sectional view of a portion of a mounting bay 605. FIG. 7 shows a cut away perspective view of a mounting bay 605. FIG. 8 shows a perspective view of a mounting bay 800 with dual stacked card modules 810, 812 installed. FIG. 9 shows a perspective view of a mounting bay alignment component.

In certain embodiments the mounting bay 605 includes a floating component retention system 610. In certain embodiments, the floating component retention system 610 includes a floating component guide device 620 and a floating component retention device 630.

In certain embodiments, the floating component guide device 620 includes a first guide 640 and a second guide 642. In certain embodiments, the first guide 640 and the second guide 642 are vertically oriented with respect to each other.

In certain embodiments, the first guide 640 and the second guide 642 extend parallel with each other. In certain embodiments, each guide 640, 642 includes a tapering entry guide portion 910, 912 which facilitates insertion of respective receiving components into the floating component retention system 610. In certain embodiments, each guide 640, 642 includes a respective stop portion 920, 922 which establish an end position for the respective receiving components when they are inserted into the floating component retention system 610. The stop portions 920, 922 and the floating component retention device 630 hold the respective receiving components in a fixed position within the mounting bay 605. In certain embodiments, each guide 640, 642 includes a tapering connection guide portion 930, 932 which facilitates connection of a card with a respective receiving component.

In certain embodiments, the floating component retention device 630 includes respective retention members 650, 652 which are contiguously positioned along a rear edge of the opposing floating component guide devices 620 when the floating component retention device 630 is in a closed position. In certain embodiments, the respective retention members 650, 652 extend substantially (i.e., +/−20%) perpendicularly from a cross member 654 of the floating component retention device 630. In certain embodiments, the retention members 650, 652 include a substantially (i.e., +/−30%) flat edge which contiguously abut a vertical rear edge of respective floating component guides devices 620. In certain embodiments, the cross member 654 extends laterally across the mounting bay 605.

In certain embodiments, the floating component retention device 630 includes a lock projection 660 which allows the floating component retention device 630 to be locked in a closed position until the floating component retention device 630 is intentionally released. In certain embodiments, one or both retention members 650, 652 include respective lock projections 660. In certain embodiments, the respective lock projections 660 are positioned to mate with apertures 662 defined by the side walls of the mounting bay 605 when the floating component retention device 630 is in a closed position.

In certain embodiments, one of the card modules 810, 812 includes an internally latched card and internal latch mounting tray and another of the card modules 810, 812 includes an externally latched card and an external latch mounting tray. In certain embodiments, the mounting bay 800 includes respective guide slots 820, 822 along one or both sides of the mounting bay 800. In certain embodiments, the mounting trays are positioned within the mounting bay 800 via the respective guide slots 820, 822. In certain embodiments, the mounting bay 800 and the card modules 810, 812 provide a dual stack card mounting system. In certain embodiments, the dual stack card mounting system comprises a dual stack open component project card mounting system.

In certain embodiments, the mounting bay 800 includes a retention portion 840. In certain embodiments, the retention portion 840 includes a plurality of threaded apertures via which respective card modules 810, 812 may be physically attached to the mounting bay 800. In certain embodiments, attachment portions for each card module 810, 812 are used to physically attach the card modules to the mounting bay 800 by attaching respective attachment portions (e.g., attachment portion 842, attachment portion 1142) to respective threaded apertures.

In certain embodiments, the mounting bay 800 further includes a floating component retention system 850. In certain embodiments, at least one card module 810, 912 is coupled to a respective floating component of the floating component retention system 850. In certain embodiments, another of the at least one card modules 810, 812 may be attached to receiving portion contained on a mother board of the information handling system (i.e., a non-floating receiving component) in which the mounting bay is contained.

In operation, the floating component retention device 630 may be rotated from a closed position (see e.g., FIG. 6A) to an open position (see e.g., FIG. 6B) to allow first and second floating receiving components to be mounted within the open compute project mounting bay 605. When the floating component retention device 630 is in the open position, the first floating receiving component 630 is slid along a first pair of guides 640 contained within opposing floating component guide devices 620. The second floating receiving component 632 is then slid along a second pair of guides 642 contained within opposing floating component guide devices 620.

After one or both of the first floating receiving component and the second floating receiving component are mounted, the floating component retention device 630 is rotated from the open position (see e.g., FIG. 6B) to the closed position (see e.g., FIG. 6A). When in the closed position, the floating component retention devices fixedly mount the first floating receiving component and the second floating receiving component within the mounting bay 605.

In certain embodiments, one or both floating component guide devices 620 include respective ground components 710. In certain embodiments, each respective ground component 710 includes a first ground connector 720 and a second ground connector 722. In certain embodiments, the first ground connector 720 and the second ground connector 722 are electrically coupled via a vertical connection portion 730. In certain embodiments, the ground components 710 are electrically coupled to a metal portion of the open compute project mounting bay 805. In certain embodiments, the metal portion of the mounting bay 605 is coupled to a ground plane of the information handling system in which the mounting bay 605 is mounted. In certain embodiments, the first ground connector 720 and the second ground connector 722 are coupled to ground portions of respective receiving components. In certain embodiments, the ground components 710 provide respective ground paths for electro static discharge protection of the receiving components. In certain embodiments, the ground components 710 provide electro static discharge (ESD) protection for cards when they are coupled to respective receiving components.

Figure 10A:
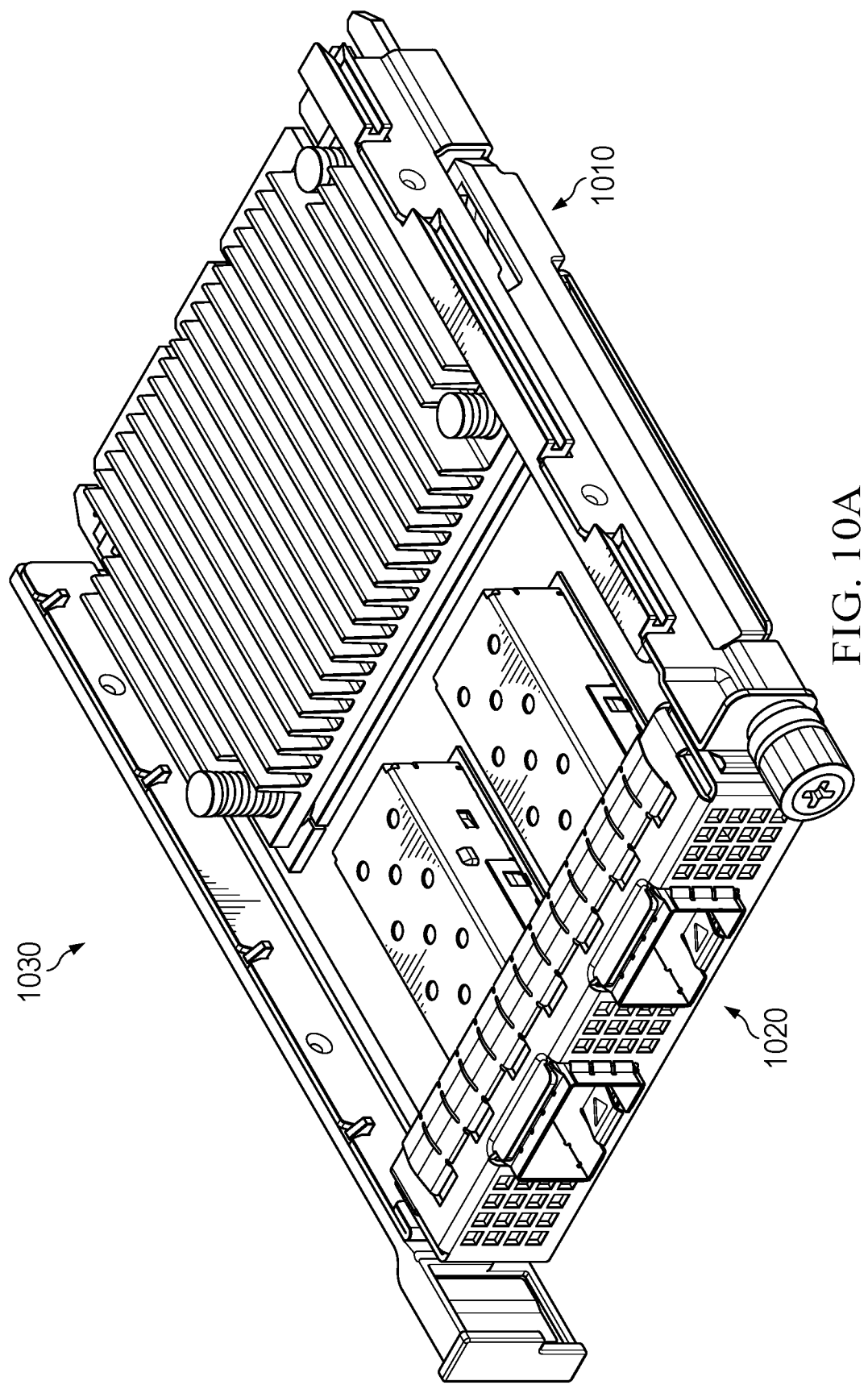
FIG. 10A shows perspective views of an open compute project mounting tray and an open compute project card mounted within the open compute project mounting tray.
Figure 10B:
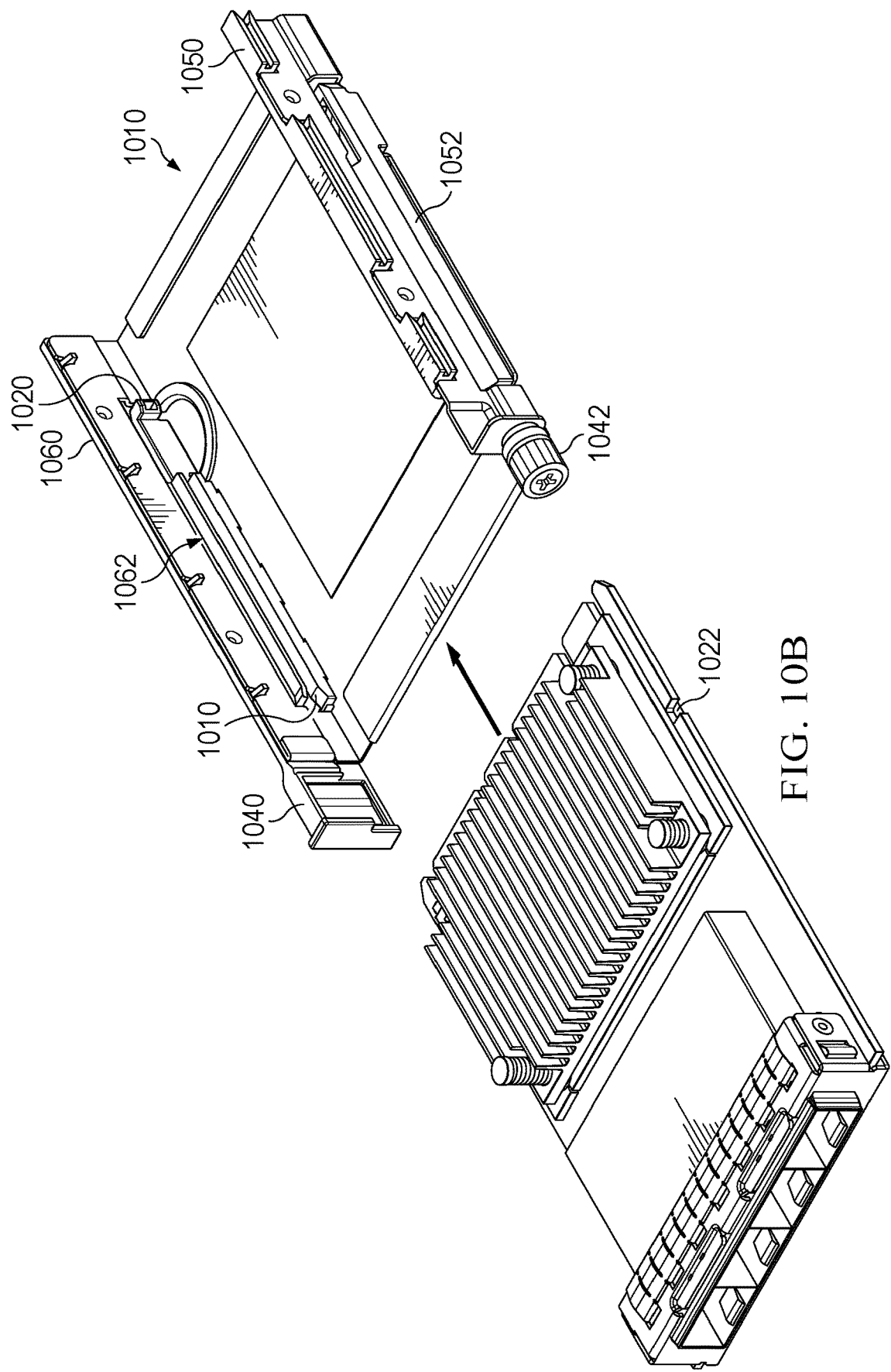
FIG. 10B shows perspective views of an open compute project mounting tray and an open compute project card.

FIG. 10A shows a perspective view of a card 1020 mounted within the mounting tray 1010. FIG. 10B shows a perspective view of a card 1020 and a separate mounting system mounting tray 1010. In certain embodiments, the card is configured according to predefined form factors. In certain embodiments, the form factors may correspond to an open compute project card form factor. In certain embodiments, the functionality of the card is defined by the Open Compute Project organization.

In certain embodiments, the mounting system mounting tray is configured as an OCP internal latch open compute project mounting tray and the open compute project card 1020 is an internal locking open compute project card. In certain embodiments, the OCP internal latch open compute mounting tray 1010 and the internal locking open compute project card 1020 provide an internal locking open compute project card assembly 1030. In certain embodiments, the open compute project mounting tray includes a removal tab 1040. In certain embodiments, the open compute project mounting tray 1010 includes an external attachment portion 1042. In certain embodiments, the external attachment portion 1042 includes a screw component such as a thumbscrew.

In certain embodiments, the mounting tray 1010 includes a right side bay guide component 1050 and a right side card guide component 1052. In certain embodiments, the mounting tray 1010 includes a left side bay guide component 1050 and a left side card guide component 1052. In certain embodiments, one or both the right side bay guide component 1050 and the left side bay mounting component mate with respective mounting slots defined by the bay. In certain embodiments, the removal tab 1040 and the left side bay guide component 1050 are integrated into a single component.

In certain embodiments, one or both the right side card guide component 1052 and left side card guide component 1062 include a guide card portion 1310. In certain embodiments, the right side card guide component 1052 includes a locking projection 1320. In certain embodiments, the locking projection 1320 mates with a locking indentation 1322 of the OCP card when the OCP card is installed in the open compute project mounting tray 1010.

Figure 11A:
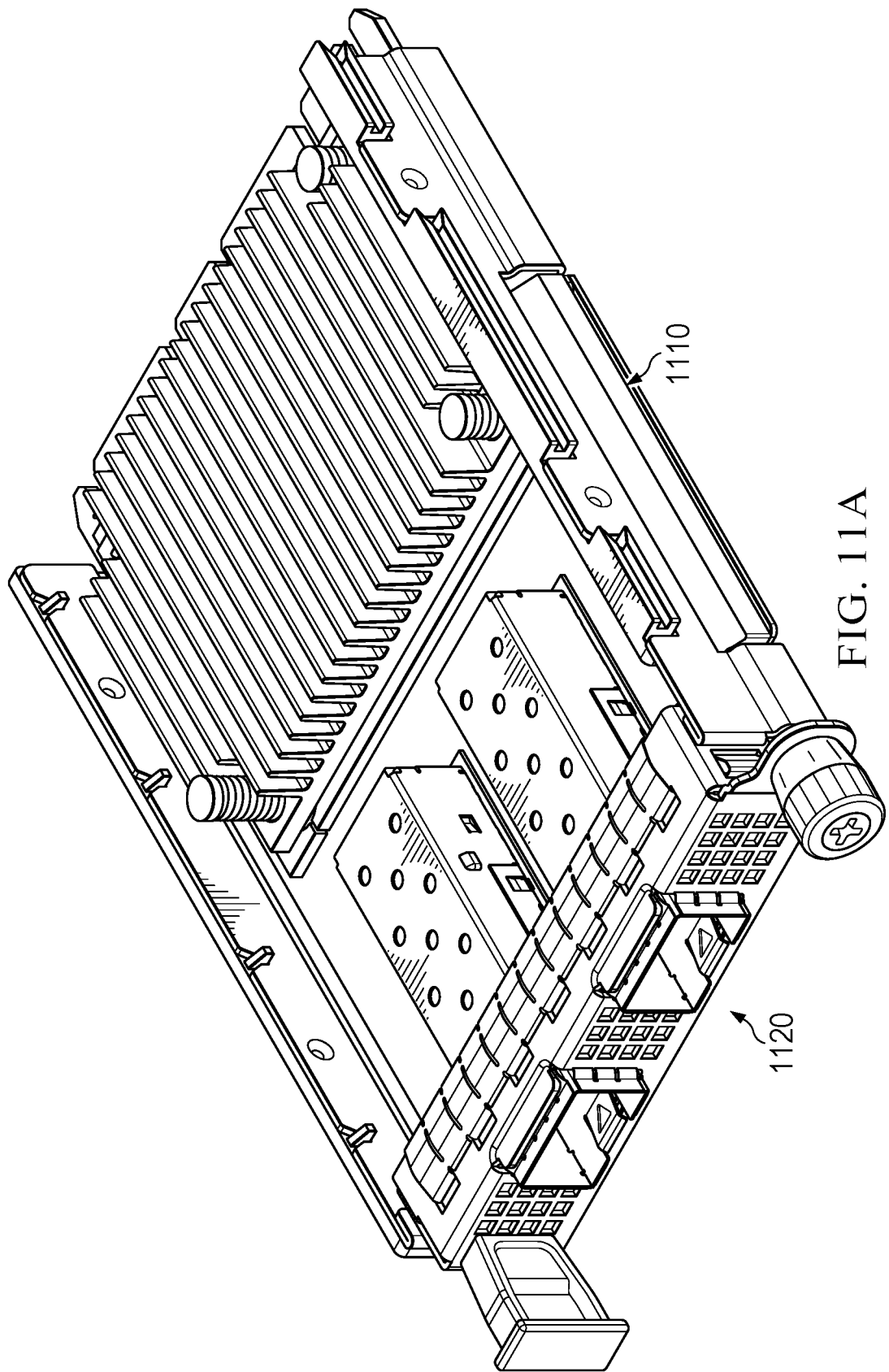
FIG. 11A shows a perspective view of an open compute project mounting system mounting tray and an open compute project card mounted within the open compute project mounting tray.
Figure 11B:
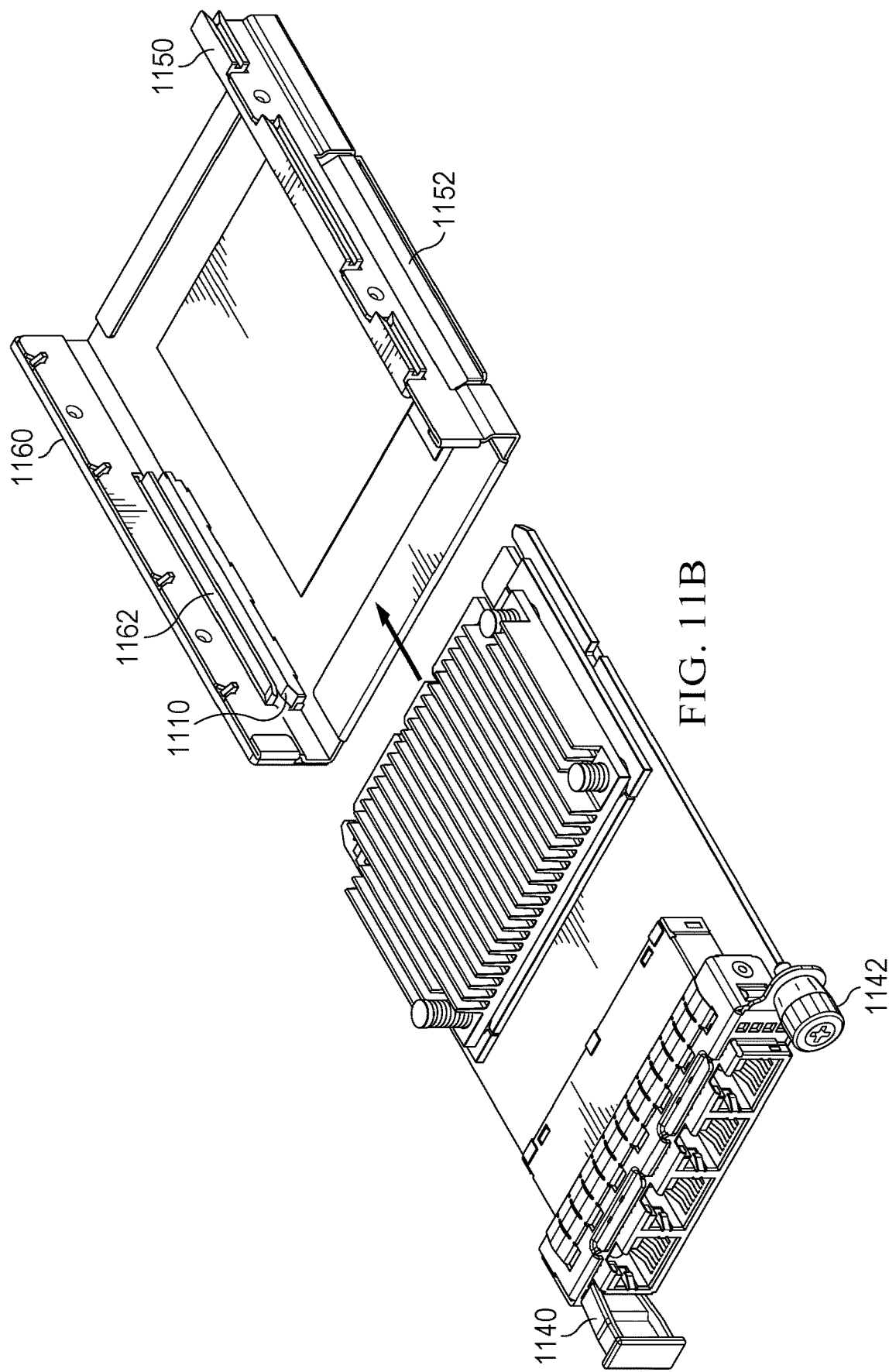
FIG. 11B shows perspective views of an open compute project mounting system mounting tray and an open compute project card.

FIG. 11A shows perspective views of a card 1120 mounted within a mounting tray 1110. FIG. 11B shows a perspective view of a card 1120 and a separate a mounting system mounting tray 1110. In certain embodiments, the card is configured according to predefined form factors. In certain embodiments, the form factors may correspond to an open compute project card form factor. In certain embodiments, the functionality of the card is defined by the Open Compute Project organization.

In certain embodiments, the mounting tray 1110 is configured as an OCP external latch open compute project mounting tray and the card 1120 is an external locking open compute project card. In certain embodiments, the external latch open compute mounting tray 1110 and the external locking open compute project card 1120 provide an external locking open compute project card assembly 1130.

In certain embodiments, the card includes a removal tab 1140. In certain embodiments, the card includes an external attachment portion 1142. In certain embodiments, the external attachment portion 1142 includes a screw component such as a thumbscrew.

In certain embodiments, the mounting tray 1110 includes a right side bay guide component 1150 and a right side card guide component 1152. In certain embodiments, the open compute project mounting tray 1110 includes a left side bay guide component 1150 and a left side card guide component 1152. In certain embodiments, one or both the right side bay guide component 1150 and the left side bay mounting component mate with respective mounting slots defined by the bay. In certain embodiments, the right side card guide component 1152 includes a guide card portion 1510.

Figure 12:
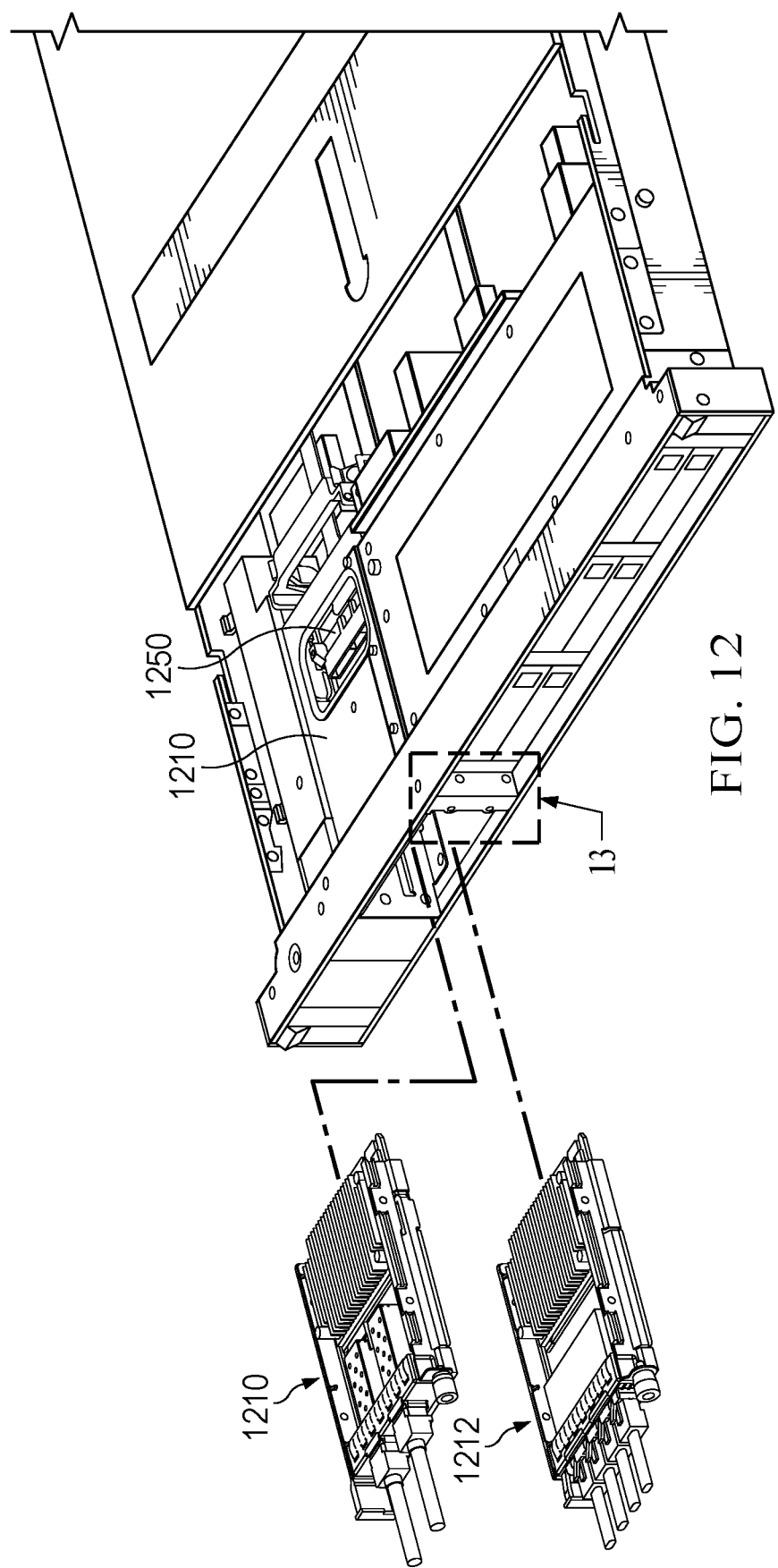
FIG. 12 shows a perspective view of a portion of a server type information handling system as well as a plurality of open compute project cards being inserted into the server type information handling system.
Figure 13:
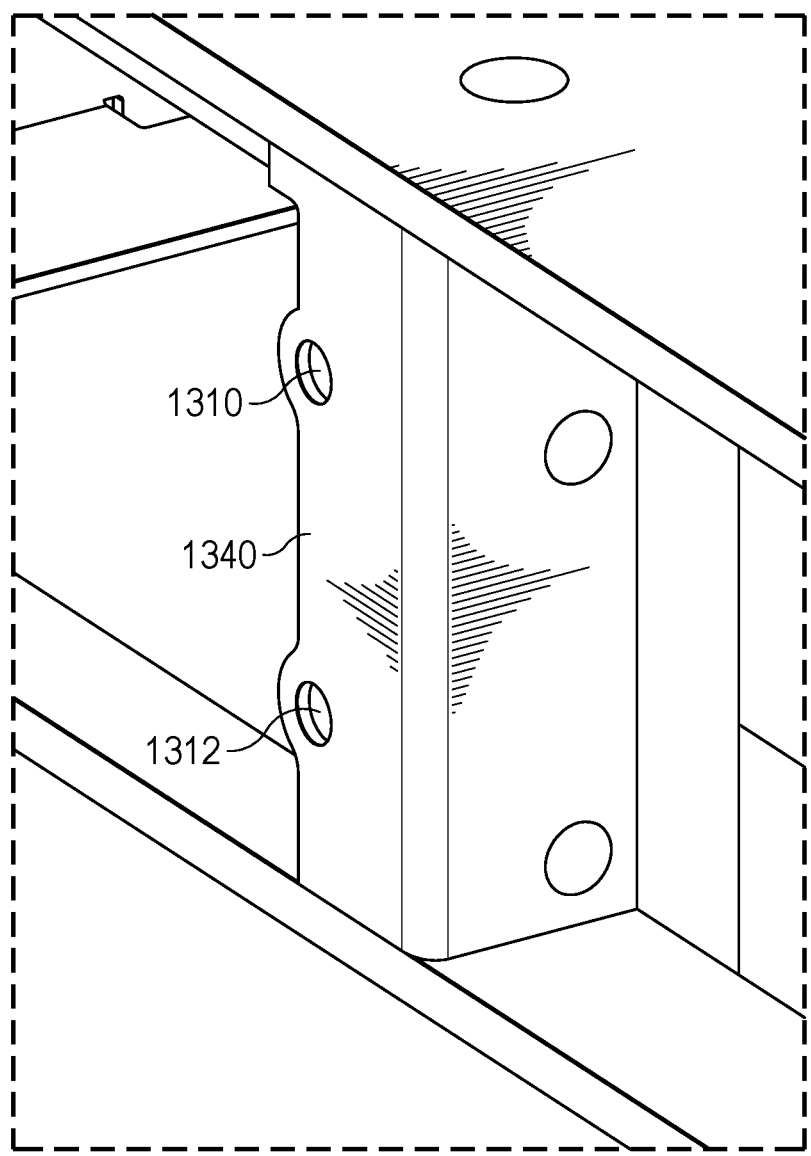
FIG. 13 shows a retention portion of an OCP mounting bay.

FIG. 12 shows a perspective view of a portion of a server type information handling system as well as a plurality of open compute project cards being inserted into the OCP mounting bay 1205 of the server type information handling system. FIG. 13 shows a retention portion of an OCP mounting bay.

In certain embodiments, one of the card modules 1210, 1212 includes an internally latched card and internal latch open compute project mounting tray and another of the card modules 1210, 1212 includes an externally latched card and an external latch open compute project mounting tray. In certain embodiments, the mounting bay 1200 includes respective guide slots along one or both sides of the mounting bay 1205. In certain embodiments, the mounting trays are positioned within the mounting bay 1205 via the respective guide slots. In certain embodiments, the mounting bay 1205 and the card modules 1210, 1212 provide a dual stack OCP card mounting system.

In certain embodiments, the mounting bay 1205 includes a retention portion 1240. In certain embodiments, the retention portion 1640 includes a plurality of threaded apertures 1210, 1212 via which respective OCP card modules 1210, 1212 may be physically attached to the OCP mounting bay 1205. In certain embodiments, attachment portions for each OCP card module 1210, 1212 are used to physically attach the OCP card modules to the OCP mounting bay 1205 by attaching respective attachment portions (e.g., attachment portion 1042, attachment portion 1142) to respective threaded apertures 1810, 1812.

In certain embodiments, the OCP mounting bay 1205 further includes a floating OCP component retention system 1250. In certain embodiments, each OCP card module 1210, 1212 is coupled to a respective floating component of the floating OCP component retention system 1250.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

Consequently, the invention is intended to be limited only by the spirit and scope of the appended claims, giving full cognizance to equivalents in all respects.

What is claimed is:

1. A floating network component retention system, comprising:
    a floating network component guide device, the floating network component guide device being configured to mount within a rear portion of a network component mounting bay; and,
    a floating network component retention device configured to be mounted to a rear edge of the network component mounting bay, the floating network component retention device providing access to the floating network component guide device when in an open position and fixedly mounting a floating network receiving assembly within a network component mounting bay when in a closed position.

2. The floating network component retention system of claim 1, wherein:
    the floating network component guide device comprises a first guide and a second guide, the first guide and the second guide being vertically oriented with respect to each other.

3. The floating network component retention system of claim 2, wherein:
    the first guide and the second guide of the floating network component guide device include respective tapering floating network component entry guide portions.

4. The floating network component retention system of claim 2, further comprising:
    the first guide and the second guide of the floating network component guide device include respective floating network component stop portions.

5. The floating network component retention system of claim 1, wherein:
    the floating network component guide device comprises a ground component, the ground component providing a ground function for the floating network receiving assembly when the floating network receiving assembly is mounted to the floating network component guide device.

6. The floating network component retention system of claim 1, wherein:
    the floating network component retention device comprises a cross member and a retention member, the cross member extending across a network mounting bay, the retention member extending substantially perpendicularly from the cross member.

7. A network component mounting system comprising:
    a network component mounting bay; and,
    a floating network component retention system mounted within the network component mounting bay, the floating network component retention system comprising:
        a floating network component guide device, the floating network component guide device being configured to mount within a rear portion of the network component mounting bay; and,
        a floating network component retention device configured to be mounted to a rear edge of the network component mounting bay, the floating network component retention device providing access to the floating network component guide device when in an open position and fixedly mounting a floating network component receiving assembly within the network component mounting bay when in a closed position.

8. The network component mounting system of claim 7, wherein:
    the floating network component guide device comprises a first guide and a second guide, the first guide and the second guide being vertically oriented with respect to each other.

9. The network component mounting system of claim 8, wherein:
    the first guide and the second guide of the floating network component guide device include respective tapering floating network component entry guide portions.

10. The network component mounting system of claim 8, wherein:
    the first guide and the second guide of the floating network component guide device include respective floating network component stop portions.

11. The network component mounting system of claim 7, wherein:
    the floating network component guide device comprises a ground component, the ground component providing a ground function for the floating network receiving assembly when the floating network receiving assembly is mounted to the floating network component guide device.

12. The network component mounting system of claim 7, wherein:
    the floating network component retention device comprises a cross member and a retention member, the cross member extending across the network mounting bay, the retention member extending substantially perpendicularly from the cross member.

13. A system comprising:
a processor;
a data bus coupled to the processor;
a network component mounting bay; and,
a floating network component retention system mounted within the network component mounting bay, the network component project retention system comprising:
 a floating network component guide device, the floating network component guide device being configured to mount within a rear portion of the network component mounting bay; and,
 a floating network component retention device configured to be mounted to a rear edge of the network component mounting bay, the floating network component retention device providing access to the floating network component guide device when in an open position and fixedly mounting a floating network component receiving assembly within the network component mounting bay when in a closed position.

14. The system of claim 13, wherein:
the floating network component guide device comprises a first guide and a second guide, the first guide and the second guide being vertically oriented with respect to each other.

15. The system of claim 14, wherein:
the first guide and the second guide of the floating network component guide device include respective tapering floating network component entry guide portions.

16. The system of claim 13, wherein:
the first guide and the second guide of the floating network component guide device include respective floating network component stop portions.

17. The system of claim 13, wherein:
the floating network component guide device comprises a ground component, the ground component providing a ground function for the floating network receiving assembly when the floating network receiving assembly is mounted to the floating network component guide device.

18. The system of claim 13, wherein:
the floating network component retention device comprises a cross member and a retention member, the cross member extending across a network mounting bay, the retention member extending substantially perpendicularly from the cross member.

* * * * *